Jan. 19, 1965     M. C. KOESTER     3,166,188
PACKAGING DEVICE

Filed March 18, 1964     3 Sheets-Sheet 1

INVENTOR.
Melvin C. Koester
BY
Nobbe & Swope
ATTORNEYS

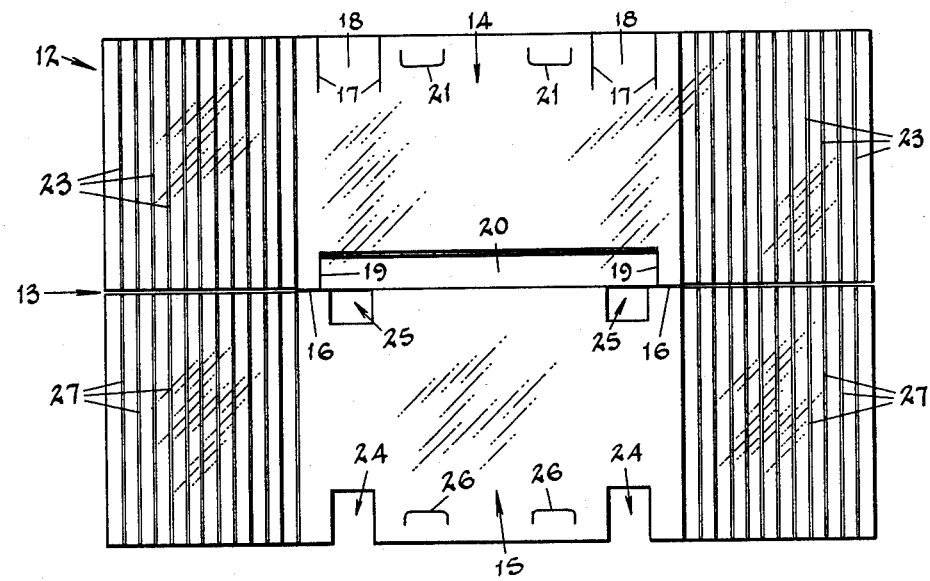
Fig. 5.
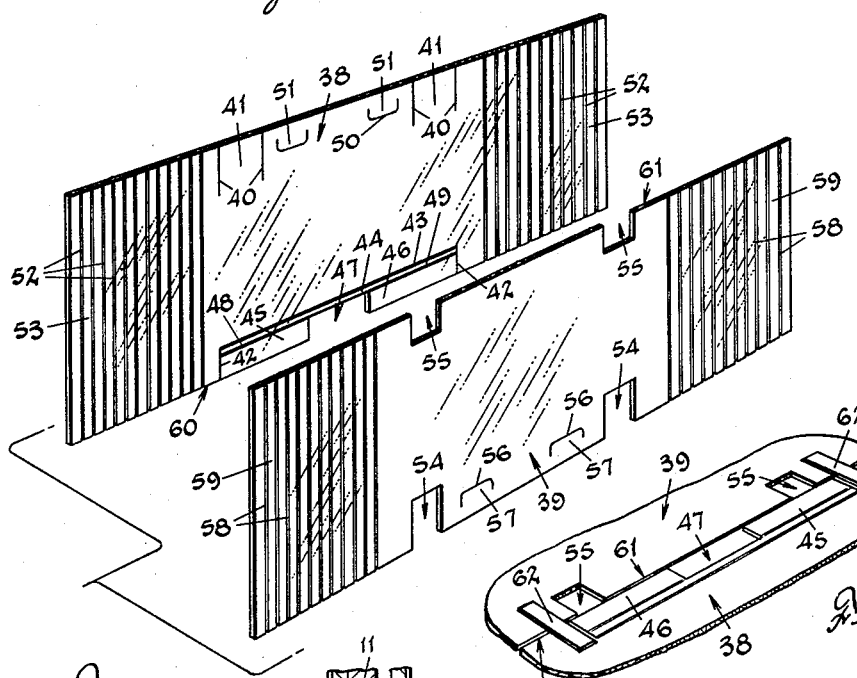
Fig. 6.
Fig. 7.
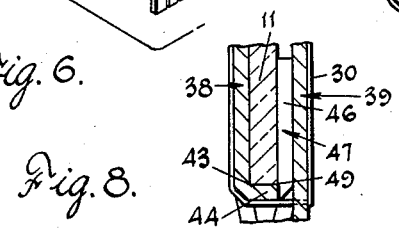
Fig. 8.
INVENTOR.
Melvin C. Koester
BY
Nobbe & Swope
ATTORNEYS Jan. 19, 1965 M. C. KOESTER 3,166,188
PACKAGING DEVICE Filed March 18, 1964 3 Sheets-Sheet 3

INVENTOR.
Melvin C. Koester
BY
Nobbe & Swope
ATTORNEYS

United States Patent Office 3,166,188
Patented Jan. 19, 1965

3,166,188
PACKAGING DEVICE
Melvin C. Koester, Toledo, Ohio, assignor to Libbey-Owens-Ford Glass Company, Toledo, Ohio, a corporation of Ohio
Filed Mar. 18, 1964, Ser. No. 360,471
3 Claims. (Cl. 206—62)

The present invention relates broadly to a packaging device for sheet-like objects, and more particularly to a novel packaging device for sheets of frangible material such as the front and rear windows of automotive vehicles.

This application is a continuation-in-part of copending application Serial No. 97,319, filed March 21, 1961.

In present day automobiles, the windshields and rear windows are generally quite large and often are of a compound curvature. Because of their unique shape and structural characteristics, packaging of the individual units for shipment is extremely difficult. The present invention has been found particularly useful in the packaging of the rear windows, commonly referred to as backlights, which are usually formed of tempered glass. While such tempered glass sheets possess considerable structural strength, it is necessary to protect them against sharp, heavy blow, and it is particularly important to protect their edges from being chipped or abraded. As is well known, tempered glass sheets have large residual internal stresses so that heavy blows to the sheet, or chipping or abrading of its edges, may cause the entire sheet to shatter.

Earlier devices used in the packaging of such objects for shipment have been found to be expensive to manufacture and have required an undue amount of time and labor to assemble. Many of these earlier devices were also relatively heavy and cumbersome, resulting in excessive transportation costs for the container itself.

It is therefore an object of the present invention to provide a simple, inexpensive packaging device for automobile rear windows or the like, including means for securing the window within the packaging device and spaced from the edges thereof.

Another object of the invention is to provide a packaging device which completely encloses the automobile rear window or the like and which is formed of a material having little structural strength in itself, but which effectively protects the glass from damage to its edges.

A further object of the invention is to provide a packaging device adapted to receive automobile rear windows or the like of different sizes and shapes and which will protect the edges thereof regardless of its size or shape.

A still further object of this invention is to provide a packaging device for automobile rear windows or the like in which the window becomes an integral part of the package and gives the package structural stability, while the package protects the edges and surfaces of the glass against chipping or abrasion.

Other objects and advantages of the invention will become more apparent during the course of the following description when taken in connection with the accompanying drawings.

In the drawings, wherein like numerals are employed to designate like parts throughout the same:

FIG. 5 is a view of the packaging device when made in one piece;

FIG. 6 is a view of a slightly modified, two-piece packaging device;

FIG. 7 is a view partially showing the two-piece packaging device of FIG. 6 with the separate sections joined by flexible strips;

FIG. 8 is a partial transverse sectional view through the package assembled from the two-piece packaging device of FIGS. 6 and 7;

Figure 1:
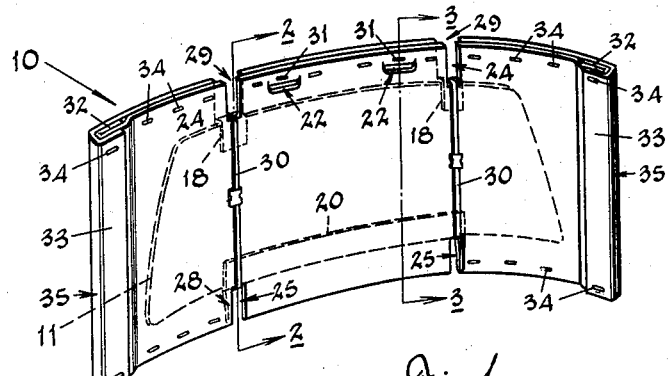
FIG. 1 is a perspective view of an assembled packaging device constructed according to the invention.

With reference now to the drawings there is illustrated in FIG. 1, a packaging device according to the invention which comprises an assembled package 10 containing a bent rear automobile window 11 or other sheet-like object. The package 10 includes a packaging device formed of a single rectangular sheet 12 of fiberboard or similar material as shown in FIG. 5. The sheet 12 is adapted to fold along a longitudinal centerline 13 to form a supporting panel 14 and a cover panel 15 of equal size. The supporting panel 14 and the cover panel 15 are severed from one another along the centerline 13 except for narrow connecting portions 16 to allow portions of the panels to be folded independently as will be later described.

Figure 3:
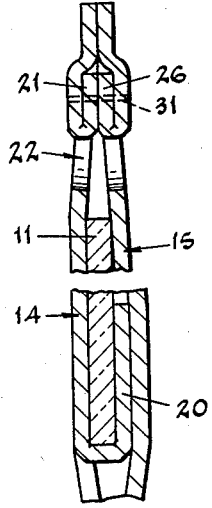
FIG. 3 is a partial sectional view taken substantially along line 3—3 of FIG. 1.

As best shown in FIG. 5, the supporting panel 14 is provided with spaced parallel slits 17 extending inwardly from the edge thereof opposite the center line 13 to provide a pair of flaps 18 for folding over one edge of the glass sheet 11 in a manner hereinafter described. The panel 14 has additional slits 19 extending inwardly from the centerline 13 to form an elongated flap 20 for folding over the opposite edge of the glass sheet. Located closely adjacent the free edge of the panel 14 and between the flaps 18 are a pair of spaced tabs 21, severed from the panel along three of their sides, and which are folded over against the inner surface of the panel in the assembled package to form hand holes 22 for carrying the package as shown in FIG. 3.

Extending transversely of the supporting panel 14 at its ends are a series of parallel creases 23. These creases enable the panel to follow the contour of the end portions of the glass sheet where the curvature is likely to be most severe, and also allow the ends of the panel to be folded over and fastened to close the ends of the package as will be hereinafter described.

The cover panel 15 is provided in the outer longitudinal edge thereof with spaced notches 24 which correspond with the flaps 18 of the panel 14 when the packaging member 12 is folded along the centerline 13. At the opposite edge of the panel 15 and adjacent the end portions of the elongated flap 20 is located a pair of similar notches 25 disposed opposite notches 24. An additional pair of tabs 26 corresponding to the spaced tabs 21 of panel 14 are also adapted to fold inwardly and form with the tabs 21, the hand holes 22 when the packaging device is assembled as shown in FIG. 1. The end portions of panel 15 are likewise provided with spaced transverse creases 27 similar to the creases 23 in panel 14.

In assembling the packaging device above described, the elongated flap 20, which is in the open or flat position in FIG. 5, is first folded over toward the inner surface of the supporting panel 14. The sheet 12 is then folded along the centerline 13 so that the cover panel 15 is disposed in contact with the folded-over elongated flap 20 of supporting panel 14. A glass sheet 11 is then inserted between the supporting and cover panels and its leading edge received between the folded-over elongated flap 20 and the supporting panel 14 to which the flap is attached.

Figure 2:
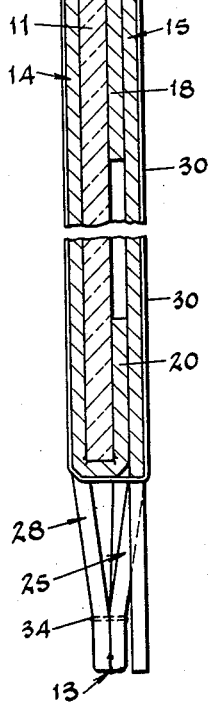
FIG. 2 is a sectional view taken substantially along line 2—2 of FIG. 1.

The flaps 18 are then folded over the opposite edge of the sheet and inserted between its opposite surface and the cover panel 15 in the manner best seen in FIG. 2. It will be noted that the flaps 18 and 20 are folded over closely adjacent the edges of the glass sheet and down along its opposite surface so that the glass sheet will be held securely in place against the supporting panel. The flaps 18 are made deep enough to accommodate glass sheets of different heights, it being only necessary to fold over more of the flaps for narrower sheets.

When the sheet 12 is folded along the centerline 13, the notches 25 in the panel 15 will be disposed opposite the notch 28 which results from the folding of the elongated flap 20, while the notches 24 will be in registry with the notches 29 created in the opposite edge of the panel 14 upon folding of the flaps 18 over the edge of the glass sheet. To hold the glass sheet firmly in place within the folded-over flaps 18 and 20 between the panels 14 and 15, banding straps 30 of metal or a suitable tape are wrapped around the folded panels, with the straps passing through the mating notches 24–29 and 25–28 formed in the edges of the supporting and cover panels.

In this connection, it is to be noted that one of the important features of this invention resides in the fact that the banding straps 30 are not secured so as to actively grip and thus exert undesired pressure on the edges of the glass sheet 11. In fact, the flaps 18 and the elongated flap 20 operate to cover and protect the edges of the glass sheet and to support the same between the panels 14 and 15. Thus, the straps 30 are positioned not only about the folded flaps 18 and 20, but also about the surfaces of the panels 14 and 15, between the inner edges of the notches 24–29 and 25–28.

To strengthen the hand holes 22 for carrying the assembled package, the tabs 21 and tabs 26 are folded over against the inner surfaces of the panels to which they are attached, and the four layers of material above the hand holes secured by staples 31.

Figure 4:
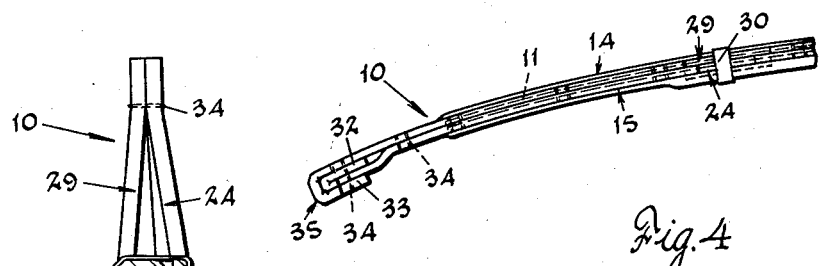
FIG. 4 is a plan view looking toward a longitudinal edge of the assembled package as from above in FIG. 1.

As best shown in FIG. 4, the marginal end portions 32 of the cover panel 15 are folded inwardly upon themselves while the marginal end portions 33 of the supporting panel 14 are folder inwardly over the folded marginal end portions 32 of panel 15 and stapled at 34 to form reinforced ends 35. The panels 14 and 15 are also joined along their upper and lower edges by staples 34 to thereby complete the assembled package.

A modified form of the invention, particularly adapted for use in packaging sheets having a cylindrical curvature in their central areas, is shown in FIGS. 6 through 8. As will be evident from FIG. 6, the supporting panel 38 and cover panel 39 are formed as separate units. The supporting panel 38 is provided in one edge with spaced pairs of parallel slits 40 to provide relatively short flaps 41. In its opposite edge, the supporting panel 38 is provided with spaced parallel slits 42 between the inner ends of which a fold line 43 is impressed into the panel to form a relatively narrow edge protecting strip 44 of a length equal to the distance between the slits 42. Formed integral with the edge protecting strip 44, at the opposite ends thereof, are flaps 45 and 46 spaced from one another to provide a notch 47 therebetween. Fold lines 48 and 49 are impressed into the flaps 45 and 46 where they join the narrow strip 44 so that when the said strip 44 is folded along line 43 it will be disposed opposite the edge of the glass sheet 11, while the flaps 45 and 46, when folded along lines 48 and 49, will be disposed opposite the front face of the sheet as shown in FIG. 8.

Accordingly, when the edge of a glass sheet having a relatively deep cylindrical curvature in the central area thereof is supported on the narrow protective strip 44, the flaps 45 and 46 will be folded along the lines 48 and 49 and, without undesired buckling or bulging, to substantially conform to the cylindrical curvature of the sheet against which they will be positioned as best seen in FIG. 8. The supporting panel 38 is further provided with U-shaped slits 50 to provide a pair of foldable tabs 51 for creating hand holes, as well as transverse parallel fold lines 52 in its opposite end areas 53.

The cover panel 39, on the other hand, has pairs of transversely aligned notches 54 and 55 in the opposite edges thereof which register with the notches created upon folding of the short flaps 41 and the flaps 45 and 46 over the edges of the glass sheet. Between the notches 54 in panel 39, are U-shaped slits 56 from which tabs 57 can be folded to cooperate with the foldable tabs 51 of panel 38 to form hand holes for carrying the assembled package. The cover panel 39 also has transverse parallel fold lines 58 in the opposite end areas 59 thereof. It is believed apparent that the surface of support panel 38 with the transverse fold lines 52 and the surface of the cover panel 39 with the transverse fold lines 58, as viewed in FIG. 6, will become the inwardly directed surfaces of the assembled package so that, as herein illustrated, the bottom edge 60 of panel 38 and the top edge 61 of panel 39 will be located in edgewise abutting relation as shown in FIG. 7.

In assembling the panels 38 and 39, the supporting panel 38 and cover panel 39, laid out flat, with their outwardly directed surfaces placed uppermost, in side-by-side relation, and with the respective edges 60 and 61 substantially in edgewise engagement as in FIG. 7, are joined together by strips 62 of flexible tape placed adjacent the slits 42 in panel 38.

The panels are then turned over in order that, in assembling the package with a glass sheet, the said sheet will be centrally positioned on the supporting panel 38 between the edges and the end areas thereof. The elongated edge protection strip 44 and flaps 45 and 46 are folded over one edge of the sheet while the flaps 41 are folded over the opposite edge thereof. The cover panel is then placed against the folded over flaps, with the notches 54 and 55 therein registering with the notches formed by the folding of the flaps 41, 45 and 46 in supporting panel 38, after which bands, similar to the bands 30 in FIG. 1, are wrapped around the supporting and cover panels to secure them together. The end portions of the panels are then folded over upon one another and the two panels stapled together.

It is believed apparent that the packaging device herein disclosed and formed by either the panels 14 and 15 or 38 and 39, is adapted to receive glass sheets of different sizes and shapes. In fact, due to the novel features of the invention, the package device is equally well adapted to accommodate bent glass sheets having different curvatures. While the utility of the narrow edge supporting strip 44 and spaced flaps 45 and 46 have been described particularly with reference to the structure of FIG. 6, it will be appreciated that the supporting panel 14 of FIG. 5 can be formed in the same manner if desired. An important advantage of the relatively long flap 20 in FIG. 5 and the edge protecting strip 44 in FIG. 6 is that they provide a relatively long line of support for the bottom edge of the glass sheet when the package is assembled and transported by the hand holes 22.

Figure 9:
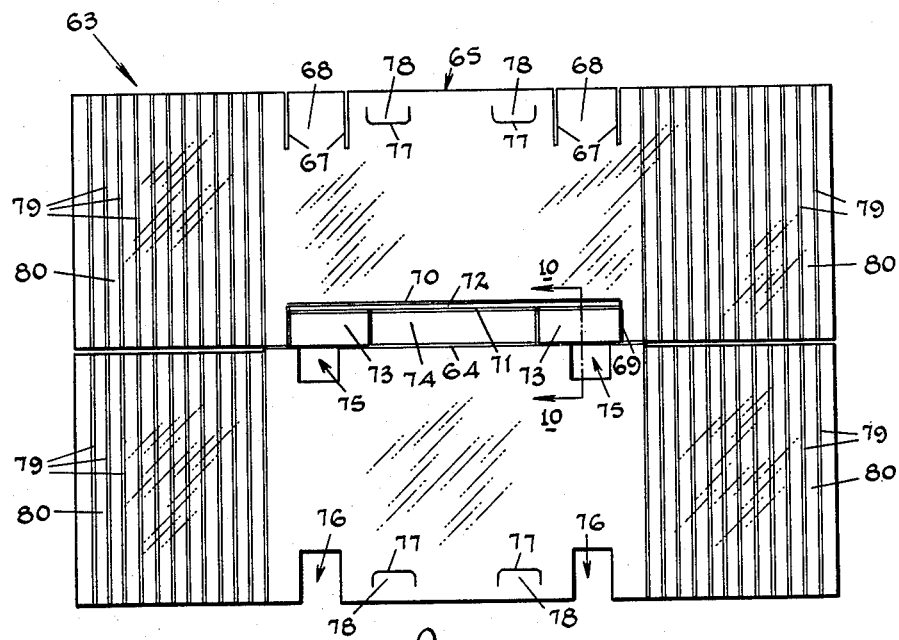
FIG. 9 is a view of still another modification of the packaging device.
Figure 10:
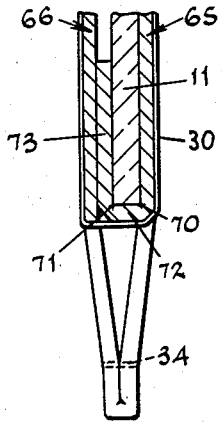
FIG. 10 is a partial transverse sectional view through a package assembled from the packaging device of FIG. 9 and taken substantially along line 10—10 of FIG. 9.

There is shown in FIGS. 9 and 10, a modification of the invention illustrated in FIGS. 6 to 8 wherein the packaging device is formed of a single sheet 63 of fiberboard or the like, which is adapted to fold along a longitudinal centerline 64 into a supporting panel 65 and a cover panel 66. The supporting panel 65 is provided with pairs of spaced slits 67 extending inwardly from its outer edge to form flaps 68. Spaced slits 69 extend inwardly from the opposite edge of the supporting panel, and a fold line 70 is impressed into the panel and extends between the slits 69. A second fold line 71 extends parallel to the fold line 70 between the slits 69 to form an edge strip 72. Spaced flaps 73 and a central connecting tab 74 depend from the edge strip 72. When assembled as shown in FIG. 10, the flaps 73 are disposed along the opposite face of the sheet with the strip 72 abutting the edge thereof. The central connecting tab 74 joins the panels 65 and 66 along the fold line 65.

The cover panel 66 has pairs of oppositely disposed recesses 75 and 76 which register with the notches created upon folding of the flaps 68 and 73 over the edges of the sheet 11 and along its opposite surface. Both the supporting and cover panels are further provided with U-shaped slits 77 which form foldable tabs 78 for creating hand holes. Transverse parallel fold lines 79 in the opposite end areas 80 of each panel permit the ends to be folded over in assembling the package. As shown in FIG. 10, bands 30 surround the supporting and cover panels within the notches formed by folding over the flaps 68 and 73, and the matching notches 76 and 75 in the cover panel, respectively. The panels are stapled at 34 around the periphery as in the previously described embodiments.

It will thus be seen that according to the invention there is provided an improved device for individually packaging sheet-like frangible articles such as automobile rear windows, or the like, in which the packaged article is completely enclosed within the package and adds strength to the package, while itself being effectively protected by the packaging device. The novel device herein provided is inexpensive to manufacture and hence is disposable after use, yet the completed package is strong and durable so as to withstand rough handling and repeated loading and unloading from transportation vehicles without damage to the enclosed article.

It is to be understood that the forms of the invention disclosed herein are to be taken as the preferred embodiments thereof, and that various changes in the shape, size and arrangement of parts may be resorted to without departing from the spirit of the invention.

I claim:

1. A unitary packaging device for sheets of frangible material such as automobile rear windows or the like, which comprises a frangible sheet, a supporting panel overlying one face of the sheet and having dimensions greater than said sheet, a first pair of spaced integral flaps formed by parallel slits extending inwardly from one edge of said panel and folded over an edge and along the other face of said sheet, a pair of spaced parallel slits extending inwardly from the opposite edge of said panel, a longitudinal fold line extending between said last-named pair of slits and spaced inwardly from said opposite edge to form an edge supporting strip, a second pair of spaced flaps formed integrally with said edge supporting strip, a longitudinal fold line defining the junction between said second flaps and said edge supporting strip, said edge supporting strip abutting the opposite edge of the sheet with said second spaced flaps folded along said other face of the sheet, a cover panel having dimensions greater than said sheet overlying said other face thereof and engaging the folded-over portions of said flaps, transversely aligned notches in the opposite edges of said cover panel in registry with the notches in said supporting panel created by the folding of said flaps, banding straps encircling said sheet and said supporting and cover panels and received in said notches to hold said folded-over flaps against said other face of said sheet, and means securing the overlapping portions of said supporting and cover panels together outside the periphery of said sheet.

2. A packaging device for sheets of frangible material or the like comprising, a frangible sheet, a supporting panel overlying one face of the sheet and having dimensions greater than said sheet, first integral flaps formed by pairs of slits extending inwardly from one edge of said panel, said first flaps being folded over an edge and along the other face of said sheet, a pair of spaced, parallel longitudinal fold lines positioned inwardly from the opposite edge of said panel to form an edge strip, second flaps depending from said edge strip, each of said second flaps being disposed opposite one of said first flaps, said second flaps being folded over along said other face of said sheet with said edge strip abutting the opposite edge of said sheet, a cover panel having dimensions greater than said sheet overlying said other face thereof and engaging the folded over portions of said flaps, transversely aligned notches in the opposite edges of said cover panel in registry with the notches in said supporting panel created by the folding of said flaps, banding straps encircling said sheet and said supporting and cover panels and received in said notches to hold said folded over flaps against said other face of said sheet, and means securing the overlapping portions of said supporting and cover panels together outside the periphery of said sheet.

3. A packaging device for sheets of frangible material such as automobile rear windows or the like comprising, a frangible sheet, a packaging member consisting of a rectangular sheet of fiberboard folded along its longitudinal centerline to provide a supporting panel overlying one face of said sheet and a cover panel overlying the other face thereof, said panels projecting beyond the periphery of said sheet, pairs of slits extending inwardly from one edge of said supporting panel to form a first pair of integral flaps, said first flaps being folded over an edge and along said other face of said sheet, a pair of spaced, parallel longitudinal fold lines in said supporting panel spaced from said longitudinal centerline and forming an edge strip, a second pair of flaps depending from said edge strip, each of said second flaps being disposed opposite one of said first flaps, said second flaps being folded over along said other face of said sheet with said edge strip abutting the opposite edge of said sheet, a connecting tab depending from said edge strip between said pair of second flaps and joining said support and cover panels along said longitudinal centerline, transversely aligned notches in the opposite edges of said cover panel registering with the notches in said supporting panel created by the folding of said flaps, banding straps encircling said sheet and said supporting and cover panels and received in said notches to hold said folded over flaps against said other face of said sheet, and means securing the overlapping portions of said supporting and cover panels together outside the periphery of said sheet.

References Cited in the file of this patent

UNITED STATES PATENTS

| | | |
|---|---|---|
| 2,740,518 | Kincaid | Apr. 3, 1956 |
| 2,873,024 | Koester | Feb. 10, 1959 |
| 2,917,166 | Lidgard | Dec. 15, 1959 |
| 3,028,001 | Gleim | Apr. 3, 1962 |